US011310741B2

(12) United States Patent
Lönnblad et al.

(10) Patent No.: US 11,310,741 B2
(45) Date of Patent: Apr. 19, 2022

(54) WAKE-UP SIGNAL RELATED MONITORING OF WIRELESS DATA COMMUNICATION

(71) Applicant: Sony Corporation, Tokyo (JP)

(72) Inventors: Daniel Lönnblad, Genarp (SE);
Anders Mellqvist, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 99 days.

(21) Appl. No.: 16/637,744

(22) PCT Filed: Aug. 13, 2018

(86) PCT No.: PCT/EP2018/071915
§ 371 (c)(1),
(2) Date: Feb. 8, 2020

(87) PCT Pub. No.: WO2019/034604
PCT Pub. Date: Feb. 21, 2019

(65) Prior Publication Data
US 2020/0213948 A1    Jul. 2, 2020

(30) Foreign Application Priority Data

Aug. 18, 2017  (SE) .................................. 1730220-9

(51) Int. Cl.
*H04W 52/02*  (2009.01)

(52) U.S. Cl.
CPC ... *H04W 52/0235* (2013.01); *H04W 52/0238* (2013.01)

(58) Field of Classification Search
CPC ... H04W 52/02–0296; H04W 52/0216; H04W 52/0229; H04W 52/0235; H04W 52/0238; H04W 52/028; Y02D 30/70
See application file for complete search history.

(56) References Cited

U.S. PATENT DOCUMENTS

| 10,321,399 B1* | 6/2019 | Bowden ................ H04W 4/027 |
| 2006/0128349 A1* | 6/2006 | Yoon ................. H04W 52/0235 |
| | | 455/343.2 |

(Continued)

FOREIGN PATENT DOCUMENTS

| EP | 2398288 A2 | 12/2011 |
| WO | 2018040909 A1 | 3/2018 |

OTHER PUBLICATIONS

International Search Report and Written Opinion from corresponding International Application No. PCT/EP2018/071915, dated Nov. 15, 2018, 12 pages.

*Primary Examiner* — Chi H Pham
*Assistant Examiner* — Vladislav Y Agureyev
(74) *Attorney, Agent, or Firm* — Tucker Ellis LLP

(57) ABSTRACT

A method for monitoring wireless data communication by a user equipment connected to a wireless data network is disclosed. The method, which is performed by the user equipment, comprises the a) receiving at least one signal, wherein the at least one signal comprises at least one characteristic of a wake-up signal, b) determining whether the at least one signal is a wake-up signal or a false alarm wake-up signal, and c) reporting, based on said determining, information on the at least one signal to the wireless data network.

12 Claims, 9 Drawing Sheets

(56) References Cited

U.S. PATENT DOCUMENTS

| | | | |
|---|---|---|---|
| 2011/0312285 A1* | 12/2011 | Amir | H04W 52/0225 |
| | | | 455/69 |
| 2013/0102268 A1* | 4/2013 | Wang | G01S 19/34 |
| | | | 455/343.2 |
| 2015/0036576 A1 | 2/2015 | Jafarian et al. | |
| 2016/0295633 A1* | 10/2016 | Baligh | H04W 76/25 |
| 2018/0206192 A1* | 7/2018 | Vermani | H04L 5/0094 |
| 2019/0306797 A1* | 10/2019 | Azizi | H04L 27/2602 |
| 2019/0313338 A1* | 10/2019 | Wilhelmsson | H04W 52/0229 |
| 2020/0029302 A1* | 1/2020 | Cox | H04W 56/0015 |
| 2021/0127335 A1* | 4/2021 | Rostami | H04W 72/042 |

* cited by examiner

WAKE-UP SIGNAL RELATED MONITORING OF WIRELESS DATA COMMUNICATION

TECHNICAL FIELD

Various examples generally relate to monitoring wireless data communication which is related to wake-up signals. Various examples specifically relate to an identification of wake-up signals and false alarm wake-up signals as well as to a report of this identification.

BACKGROUND

Wireless communication is an integral part of modern life. Reducing energy consumption of wireless communication is an important task to enable various applications such as Internet of Things (IOT) or Machine Type Communication (MTC). Such a reduction of the energy consumption in the wireless communication field may e.g. be followed-up using wake-up techniques. Here, a terminal such as a user equipment (UE) may include two receivers, i.e., one main receiver and a low-power receiver. The low-power receiver may implement a comparably simple architecture and, therefore, may consume less power during operation than the main receiver. The low-power receiver can be activated when the main receiver has transitioned into an inactive state. Then, the low-power receiver can receive the wake-up signal and, in response to receiving the wake-up signal, the main receiver can transition again to the active state.

One major challenge in wireless communication is to provide secure and reliable communication. Due to the low complexity of wake-up signals, so-called false-alarm wake up signals reaching the low-power receiver may confuse the low-power receiver in such a manner that both the false alarm wake-up signal and the real wake-up signals may be received by the low-power receiver in the same manner. Therefore, wake-up signal based wireless communication is prone to disturbances arising from different communication networks.

SUMMARY

As a matter of consequence, and in order to provide for 3GPP 5$^{th}$ generation New Radio wireless data communication, there is a need for improved monitoring of energy saving, wake-up signal related wireless data communication.

It is an objective of the present application to provide a method for performing energy-saving wireless data communication in a secure and reliable manner.

Hence, a method according to the independent claim is provided. Further embodiments are defined in the dependent claims.

According to an embodiment, a method for monitoring wireless data communication by a user equipment connected to a wireless data network is disclosed. The method, which is performed by the user equipment, comprises receiving at least one signal, wherein the at least one signal comprises at least one characteristic of a wake-up signal. The method further comprises determining whether the at least one signal is a wake-up signal or a false alarm wake-up signal. The method further comprises reporting, based on said determining, information on the at least one signal to the wireless data network.

According to another embodiment, a method for monitoring wireless data communication by a wireless data network connected to a user equipment is disclosed. The method, which is performed by the wireless data network, comprises receiving information reported by the user equipment, wherein the information refers to at least one signal, which is determined by the user equipment as a wake-up signal or as a false alarm wake-up signal. The method further comprises adapting the at least one signal based on the information for further transmission of the at least one signal.

For example, at least one characteristic of the at least one signal may be adapted. For example, at least one characteristic of the at least one signal may be adapted which has led to the user equipment determining the at least one signal as a false alarm wake-up signal.

Such approaches may be based on the finding that such reporting on the determined signals to the wireless data network may contribute to identifying drawbacks potentially occurring in the energy-saving associated with the wake-up signals. Further, such reporting on the determined signals to the wireless data network may support the network to initiate countermeasures for improving the wake-up signaling reception reliability and to reduce the risk of false alarm detections. Such countermeasures may include appropriately adapting the at least one signal for future transmission(s). Therefore, the reported information may be used to improve security and reliability in the network.

According to another embodiment, a user equipment adapted for establishing a wireless data communication with a wireless network and comprising a low-power receiver and a main receiver is disclosed. Thereby, the user equipment is adapted to monitor the wireless data communication by receiving at least one signal, wherein the at least one signal comprises at least one characteristic of a wake-up signal. Further, the user equipment is adapted to monitor the wireless data communication by determining whether the at least one signal is a wake-up signal or a false alarm wake-up signal. Further, the user equipment is adapted to monitor the wireless data communication by reporting, based on said determining, information on the at least one signal to the wireless data network.

According to another embodiment, a node of a wireless data network adapted for establishing a wireless data communication with a user equipment which may comprise a low-power receiver and a main receiver is disclosed. Thereby, the node of the wireless data network is adapted to monitor the wireless data communication by receiving information reported by the user equipment, wherein the information refers to at least one signal which is determined by the user equipment as a wake-up signal or as a false alarm wake-up signal. Further, the wireless data network is configured to adapt the at least one signal based on the information for further transmission of the at least one signal.

A user equipment within the meaning of the present disclosure may refer to any device adapted for use by a user or, generally, any device performing technical functionality. The user equipment may be adapted for wireless data communication. The user equipment may be adapted to receive signals from a wireless data network. The user equipment may be adapted to receive wake-up signals. The user equipment may comprise a low-power receiver and a main receiver. The user equipment may be a Machine Type Communication (MTC) device or an Internet of Things (IoT) device, e.g., a sensor or actuator, etc.

A node of the wireless data network within the meaning of the present disclosure may refer to any radio-access network node or core network node of the wireless data network. For example, the node may be an access point or base station of the wireless data network.

A wake-up signal within the meaning of the present disclosure may refer to any signal, which may change the activation level of the user equipment. The wake-up signal may be received by a low-power receiver. In other examples, the wake-up signal may be received by the main receiver. Receiving the wake-up signal, e.g., by the low-power receiver, may induce a transition of the main receiver from an inactive state towards an active state. The wake-up signal may be configured in a manner in that it may not be directly receivable by the main receiver.

A false alarm wake-up signal within the meaning of the present disclosure may refer to any signal, which comprises at least one characteristic of a wake-up signal, but is not a wake-up signal. The at least one characteristic may include at least one of a time-resource, a frequency-resource, a symbol sequence and a symbol modulation of the wake-up signal. The false alarm wake-up signal may comprise physical characteristics, which are similar to the characteristics of the wake-up signal. Similarity of the wake-up signal and the false alarm wake-up signal with respect to the physical characteristics may cause that both of these signals may be received by the user equipment, e.g., by the low-power receiver.

In an embodiment of the method, reporting, based on said determining, information on the at least one signal to the wireless data network comprises selectively executing the reporting, if the at least one signal is a false alarm wake-up signal.

Thereby, information regarding disturbances of the wake-up signal communication may be recognized at the wireless network, which may thus use this information to improve wireless data communication.

In another embodiment, a plurality of signals are received, wherein the embodiment further comprises collecting information on the false alarm wake-up signals of the plurality of received signals, wherein reporting information on the false alarm wake-up signals of the plurality of received signals to the wireless data network is performed collectively.

Using such an approach providing the determined information to the wireless network in a collective manner, reporting information to the wireless network may be transmitted to the wireless network in a bundled manner, thereby improving efficiency.

In one embodiment, the collectively reporting information on the false alarm wake-up signals of the plurality of received signals to the wireless data network is performed when the collected false alarm wake-up signals exceeds a specified number, e.g. as detected within a certain time period. In one embodiment, the specified number refers to at least one of a) an absolute number of false alarm wake-up signals or b) a percentage number of false alarm wake-ups signals with respect to the total number of received signals.

Thereby, collectively reporting on information to the wireless data network is limited to cases in which a certain number of determined events is exceeded, thus further improving efficiency.

In another embodiment, collectively reporting information on the false alarm wake-up signals of the plurality of received signals to the wireless data network is performed when it is requested by the wireless data network.

Based on such an approach, the reception of determined information by the wireless network is limited to cases in which the wireless network itself indicates a need for reporting information. Thus, consumption of energy is optimized, while at the same time a reliable wireless data communication is maintained.

In another embodiment, collecting information on the false alarm wake-up signals includes information regarding points of time of receiving each of the false alarm wake-up signals.

Thereby, disturbances of the wireless data network may be correlated with a certain event occurring at a specific point of time. Such an information may be used to avoid repetition of these disturbances, thereby further improving wireless data communication. Appropriate countermeasures may be taken by the wireless data network to avoid future instances of the event.

In another embodiment, collecting information on the false alarm wake-up signals includes information regarding the geographical location of the user equipment at the point of time of receiving each of the false alarm wake-up signals.

Thereby, disturbances of the wireless data network may be correlated with a certain event, e.g., taking place when a user equipment enters a specific geographical location. Such an information may be used to avoid repetition of these disturbances, thereby further improving wireless data communication. Appropriate countermeasures may be taken by the wireless data network to avoid future instances of the event.

In another embodiment, receiving the at least one signal is performed by a low-power receiver, and said reception induces a transition of a main receiver from an inactive state towards an active state.

Thus, the method for monitoring wireless data communication may be performed in a user equipment environment achieving reduction of power consumption.

In another embodiment, the at least one characteristic of the wake-up signal includes at least one of a time-resource, a frequency-resource, a symbol sequence and a symbol modulation of the wake-up signal.

Thus, attributes characterizing wireless data information are provided, which may reliably distinguish one type of signals, for which the user equipment performs the method for monitoring wireless data communication from other types of signals, for which the wireless data communication method is not to be performed.

In another embodiment, determining whether the at least one signal is a wake-up signal or a false alarm wake-up signal is based on at least one of a time-resource, a frequency-resource a bit signal and a preamble of the false alarm wake-up signal.

Thus, attributes characterizing wireless data information are provided, which may distinguish wake-up signals and false alarm wake-up signals in a reliable manner.

In another embodiment, receiving the at least one signal is performed by a low-power receiver, wherein reporting, based on said determining, information on the at least one signal to the wireless data network is performed by a main receiver.

Thus, reporting on the determined information may be performed in an energy efficient and reliable manner.

In another embodiment, the user equipment is adapted to perform a method according to any of the embodiments outlined above.

A received signal within the meaning of the present disclosure may refer to a signal received by the user equipment. The received signal may induce a transition of the main receiver from an inactive state towards an active state.

A geographical location within the meaning of the present disclosure may refer to any position located in Earth's surface coverage, e.g. latitude and longitude or defined with respect to cells of the network by for example providing information about detected one or more cell ID:s. The geographical location may refer to a position in which a user equipment is commonly in use by a user. Further the geographical location may refer to the latest available information in the user equipment, even if that location information was derived by the user equipment at a different time instance than the false alarm wake up signal.

A low-power receiver within the meaning of the present disclosure may refer to a receiver operating at a low-power level and/or adapted to receive low-complexity signals—in particular if compared to a main receiver. The low-power receiver may receive wake-up signals and/or false alarm wake-up signals. The low-power receiver may be used to activate a main receiver.

A main receiver within the meaning of the present disclosure may refer to a receiver operating at a power level higher than the power level of the low-power receiver. Also, the complexity of the signal receiver by the main receiver may be higher than the complexity of the signals received by the low-power receivers. The main receiver may be activated by a low-power receiver based on wake-up signals, which are received by the low-power receiver.

The above summary is merely intended to give a short overview over some features of some embodiments and implementations and is not to be construed as limiting. Other embodiments may comprise other features than the ones explained above.

BRIEF DESCRIPTION OF THE DRAWINGS

The above and other elements, features, steps and characteristics of the present disclosure will be more apparent from the following detailed description of embodiments with reference to the following figures.

DETAILED DESCRIPTION OF EMBODIMENTS

Figure 1:
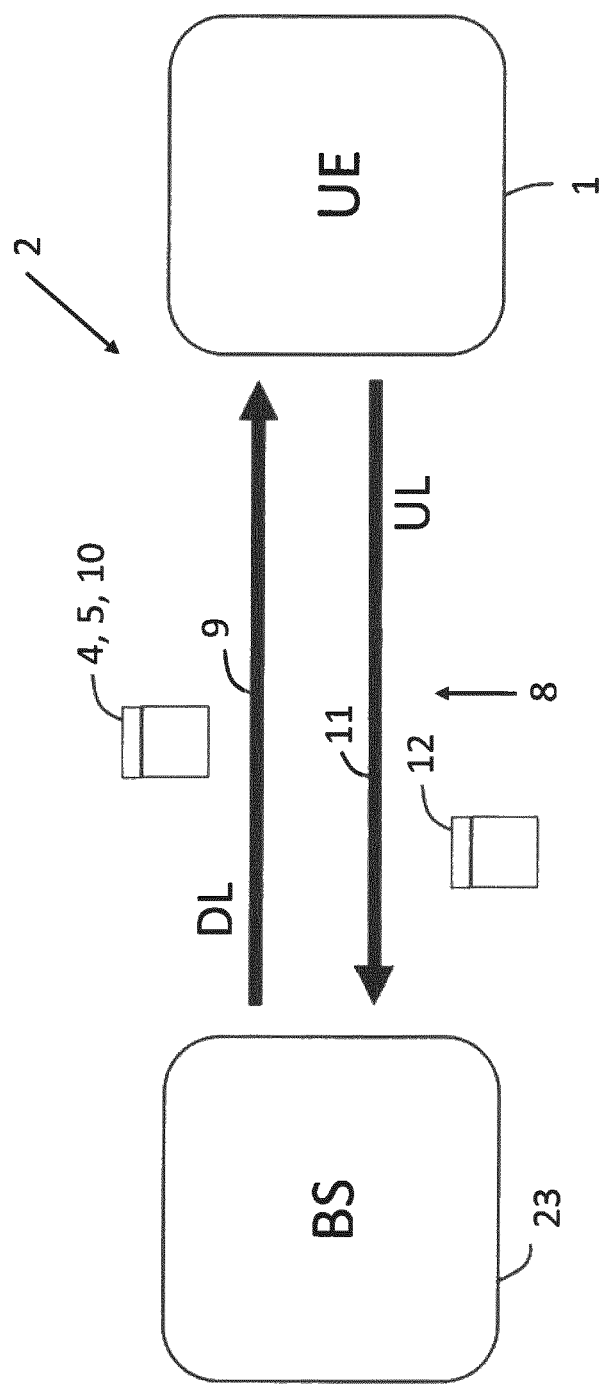
FIG. 1 schematically illustrates a wireless data network including a base station (BS) and a UE according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, wake-up techniques are described. The wake-up techniques enable a UE to transition a main receiver into a low-power state, e.g., for power-saving purposes. In some examples, the low-power state of the main receiver may be an inactive state.

The inactive state can be characterized by a significantly reduced power consumption if compared to an active state of the main receiver. For example, the main receiver may be unfit to receive any data in the inactive state such that some or all components may be shut down. Wake-up of the main receiver from the inactive state is then triggered by a wake-up signal.

The wake-up signal may be received by a dedicated low-power receiver of the UE. The wake-up signal may have a comparably simple modulation, e.g., On-Off Keying or the like, which facilitates a simple time-domain operation by the low-power receiver.

It is expected, but not required that the power consumption consumed by the low-power receiver when receiving the wake-up signal is lower than the power consumption consumed by the main receiver when receiving signals from the BS.

In other examples, the wake-up signal may be received by the main receiver in the low-power state. Here, it may not be required to provision a dedicated low-power receiver.

Since it is expected that the power consumption is lower when using a wake-up signal compared to ordinary main receiver signal reception, one typical implementation aspect is that a battery powered UE can be configured to listen for wake-up signals more often than for paging signals. In this manner, for a given energy consumption the time granularity for reaching a UE via paging can be improved using wake-up signal.

FIG. 1 schematically illustrates a wireless data network 2 for performing wireless data communication that may benefit from the techniques disclosed herein. The network 2 may be an upcoming 5G network and may be adapted to transmit wake-up signals 4. Also, false alarm wake-up signals 5 may be communicated The wireless data network 2 for wireless data communication includes a user equipment (UE) 1 and a node implemented by a base station (BS) 23. As an example, such a UE 1 might be one of the following: a smartphone; a cellular phone; a table; a note-book; a computer; a smart television; a Machine Type Communication (MTC) device; an enhance MTC (eMTC) device; an Internet of Things (IoT) device; a Narrowband IOT (NB-IoT) device; a sensor; an actuator; etc. BS 23 might also be one of the following: a Node-B (NB); an evolved Node-B (e-NB); a gNB as in NR; etc.

A wireless data link 8 provided for wireless data communication is established between the UE 1 and the BS 23. The wireless data link 8 may implement a downlink (DL) data channel 9. The DL data channel 9 can be used for transmitting downlink (DL) data 10 from the BS 23 towards the UE 1. These DL data 10 may include wake-up signals 4. The wireless data link 8 may also implement an uplink (UL) data channel 11 for transmitting uplink (UL) data 12 from the UE 1 towards the BS 23.

Figure 2:
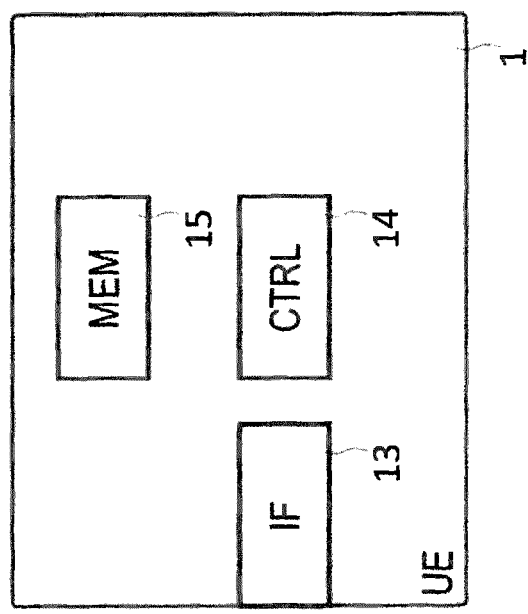
FIG. 2 schematically illustrates a UE according to various examples.

FIG. 2 schematically illustrates the UE 1. The UE 1 includes an interface 13. For example, the interface 13 may include an analog front end and a digital front end. In some examples, the interface 13 may include a main receiver and a low-power receiver (not illustrated in FIG. 2). Each one of the main receiver and the low-power receiver may include an analog front end and a digital front end, respectively. The UE 1 further includes control circuitry 14, e.g., implemented by means of one or more processors and software. The control circuitry 14 may also be at least partly implemented in hardware. For example, program code to be executed by the control circuitry 14 may be stored in a non-volatile memory 15. In the various examples disclosed herein, various functionality may be implemented by the control circuitry 14, e.g.: receiving wake-up signals 4 and/or false alarm wake-up signals 5; distinguishing wake-up signals 4 and false alarm wake-up signals 5 from each other; transitioning the main receiver 7 between an inactive state and an active state; implementing a DRX cycle of the main receiver 7 and/or of the low-power receiver 6; etc.

Figure 3B:
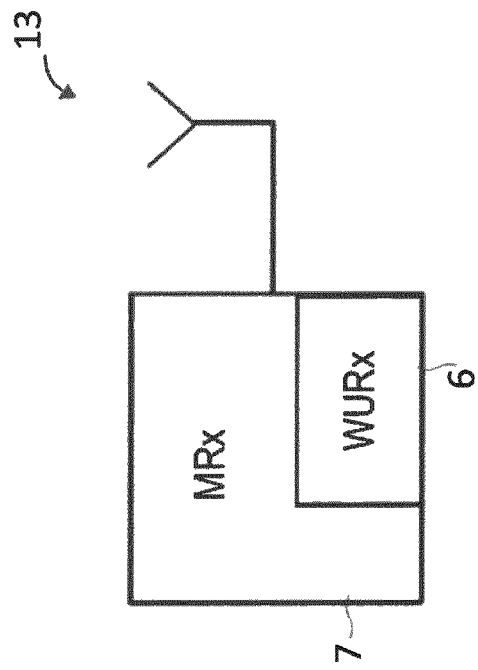
FIGS. 3a and 3b schematically illustrate a main receiver and a low-power receiver of a UE according to various examples.
Figure 3A:
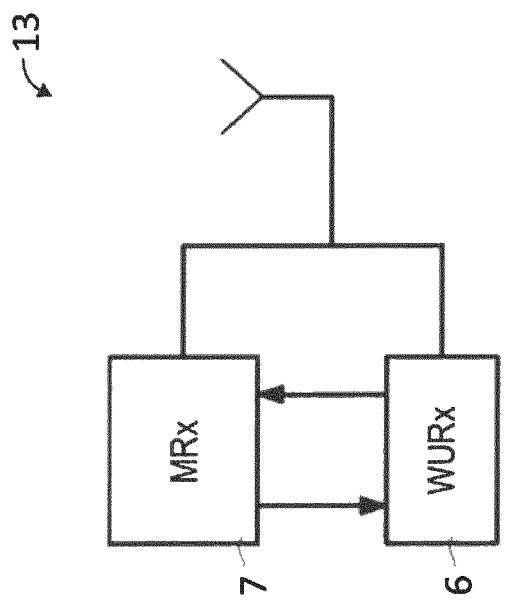

FIG. 3a illustrates details with respect to the interface 13 of the UE 1. In particular, FIG. 3a illustrates aspects with respect to a main receiver 7 and a low-power receiver 6. In FIG. 3a, the main receiver 7 and the low-power receiver 6 are implemented as separate entities. For example, they may be implemented on different chips. For example, they may be implemented in different housings. For example, they may not share a common power supply.

The scenario FIG. 3a may enable switching off some or all components of the main receiver 7 when operating the main receiver in inactive state. In the various examples described herein, it may then be possible to receive wake-up signals using the low-power receiver 6.

FIG. 3b illustrates details with respect to the interface 13 of the UE 1. In particular, FIG. 3b illustrates aspects with respect to the main receiver 7 and the low-power receiver 6. In FIG. 3b, the main receiver 7 and the low-power receiver 6 are implemented as a common entity. For example, they may be implemented on the common chip, i.e., integrated on a common die. For example, they may be implemented in a common housing. For example, they may share a common power supply.

The scenario FIG. 3b may enable a particular low latency for transitioning between reception—e.g., of a wake-up signal 4—by the wake-up receiver 6 and reception by the main receiver 7.

While in FIGS. 3a and 3b a scenario is illustrated where the main receiver 7 and the low-power receiver 6 share a common antenna, in other examples, it would be also possible that the interface 13 includes dedicated antennas for the main receiver 7 and the low-power receiver 6.

While in the examples of FIGS. 3a and 3b scenarios are illustrated where there is a dedicated low-power receiver 6, in other examples there may be no low-power receiver 6. Instead, the wake-up signal 4 may be received by the main receiver 7 in a low-power state. For example, the main receiver 7 may not be fit to receive ordinary data other than the wake-up signal 4 in the low-power state. Then, in response to receiving the wake-up signal 4, the main receiver 7 may transition into a high-power state in which it is fit to receive the ordinary data, e.g., on physical shared channels of physical control channels.

Figure 4:
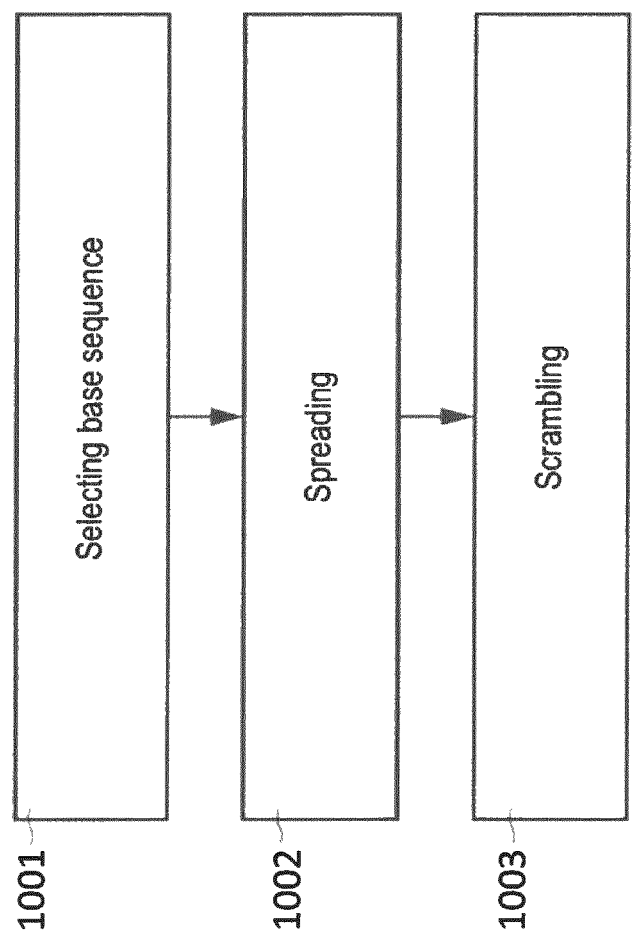
FIG. 4 is a flowchart of a method according to various examples, wherein the method of FIG. 4 relates to generating a symbol sequence of a wake-up signal.

FIG. 4 is a flowchart of a method according to various examples. FIG. 4 illustrates aspects with respect to constructing a respective wake-up signal 4. FIG. 4, thereby, illustrates examples with respect to characteristics of the wake-up signal. For example, the method according to FIG. 4 could be executed by BS 23. FIG. 4 illustrates aspects with respect to a sequence design of the wake-up signal 4. In the various examples described herein, it may be possible to construct the wake-up signals 4 according to the method of FIG. 4. Further, it might be possible that a false alarm wake-up signal 5 comprises a sequence design having a certain similarity with the sequence design of the wake-up signal 4, i.e., in that it shares at least some of the characteristics.

First, a certain base sequence is selected 1001. For example, the base sequence may be a randomly generated set of bits. For example, the base sequence may be unique for a UE 1 or a group of UEs 1. For example, the base sequence may be selected from the group including: a Zadoff-Chu sequence; a sequence selected from a set of orthogonal or quasi-orthogonal sequences; and a Walsh-Hadamard sequence. For example, selecting the particular base sequence or type of base sequence can be subject to sequence design of the wake-up signal. For example, setting the sequence length of the base sequence of the wake-up signal can be subject to sequence design of a symbol sequence of the wake-up signal.

In some examples, different base sequences may be selected for different wake-up signals 4. Thereby, it may be possible to distinguish between wake-up signals and false alarm wake-up signals. In particular, the base sequence may be selected based on an intended recipient of the wake-up signal 4, i.e., depending on the particular UE 1 to which the wake-up signal 4 is to be transmitted. In other words, it may be possible that the base sequence is uniquely associated with the respective UE 1 as the intended recipient of the wake-up signal 4. Different UEs 1 may be addressed by different base sequences. Hence, the base sequence may also be referred to as identity code.

Next, spreading may be applied to the base sequence, 1002. When spreading a bit sequence, the incoming bit sequence is spread/multiplied with a spreading sequence. Different spreading sequences may be used. Thereby, it may be possible to distinguish between wake-up signals and false alarm wake-up signals. This increases the length of the incoming bit sequence by a spreading factor K. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to sequence design of the wake-up signal.

Then, scrambling may be applied to the spread base sequence, 1003. Scrambling may relate to inter-changing or transposing a sequence of the bits of the incoming bit sequence according to one or more rules. Scrambling provides for randomization of the incoming bit sequence. Thereby, it may be possible to distinguish between wake-up signals and false alarm wake-up signals. Based on a scrambling code, the original bit sequence can be reproduced at the receiver.

Details of the scrambling can be set by a scrambling parameter. For example, the scrambling parameter can identify the one or more rules. For example, the scrambling parameter can relate to the scrambling code. Setting the scrambling parameter can be subject to sequence design of the wake-up signal.

In some examples, it may be possible to additionally add a checksum to the wake-up signal 4. Adding a checksum may be subject to sequence design of the wake-up signal 4. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc.

In some examples, it may be possible to add a preamble to the wake-up signal 4. The preamble may include a sequence of preamble bits. For example, the sequence of preamble bits may have a specific length. The sequence of preamble bits may enable robust identification of the wake-up signal 4, e.g., even in presence of burst errors, etc. The sequence of preamble bits may support the user equipment for time and/or frequency synchronization with respect to the base station signaling. Presence of the preamble, length of the preamble, and/or type of the preamble sequence, etc. can be characteristics that can be set according to a preamble parameter in sequence design of the wake-up signal. Thereby, it may be possible to distinguish between wake-up signals and false alarm wake-up signals.

Figure 5:
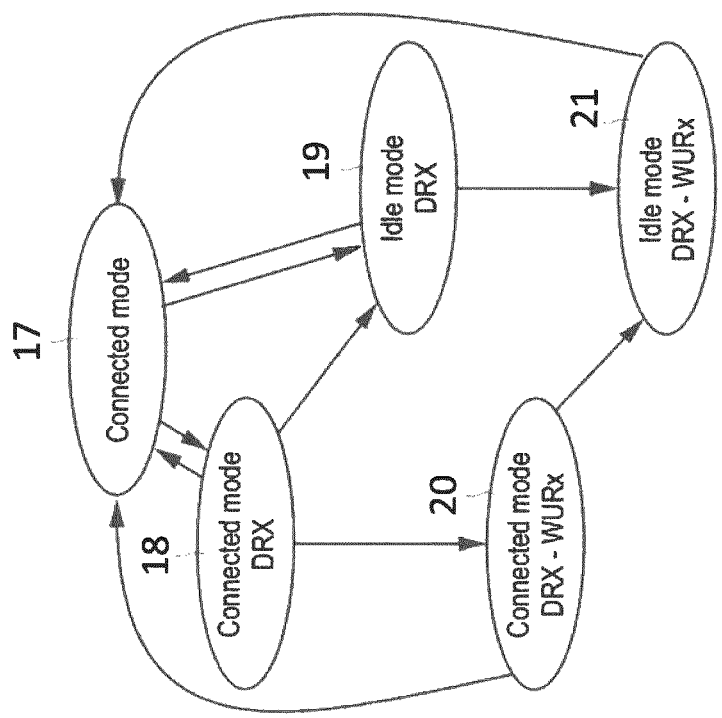
FIG. 5 schematically illustrates various modes in which a UE can operate according to various examples.

FIG. 5 illustrates aspects with respect to different modes 17-21 in which the UE 1 can operate. FIG. 5 also illustrates aspects with respect to association of communication of wake-up signals 4 and paging signals with the various modes 17-21. In the various examples described herein, it is possible that the wake-up signals 4 are communicated in certain operational modes 20, 21 of the UE 1. These modes 20, 21 may or may not be registered with the network 2.

During connected mode 17, a data connection is set up. For example, a default bearer and optionally one or more dedicated bearers may be set up between the UE 1 and the network 2. In order to reduce the power consumption, it is then possible to transition from the connected mode 17 to a connected mode 18, which employs a discontinuous reception (DRX) cycle of the main receiver 7. The DRX cycle includes on durations and off durations. During the off durations, the main receiver 7 is unfit to receive data. The timing of the DRX cycle is synchronized between the UE 1 and the BS 23 such that the BS 23 can align any DL transmission with the on durations of the connected mode DRX cycle. The bearer is maintained set-up in mode 18.

To achieve a further power reduction, it is possible to implement in idle mode 19. The idle mode 19 is, again, associated with the DRX cycle of the main receiver 7 of the UE 1. However, during the on durations of the DRX cycle in idle mode 19, the main receiver 7 is only fit to receive paging indicators and, optionally, paging messages. For example, this may help to restrict the particular bandwidth that needs to be monitored by the main receiver 7 during the on durations of the DRX cycles in idle mode 19. This may help to further reduce the power consumption—e.g., if compared to the connected mode 18.

In modes 17-19 the main receiver 7 is operated in an active state. The low-power receiver 6 is not required.

In the example of FIG. 5, two more modes 20, 21 are illustrated. Both modes 20, 21 relate to scenarios where the main receiver 7 is operated in an inactive state. Hence, during the modes 20, 21, the main receiver 7 is persistently switched off and, in particular, not switched on during any on durations. Differently, during the modes 20, 21, the low-power receiver 6 is at least sometimes operating in an active state, e.g., according to a respective DRX cycle of the low power receiver 6.

In mode 20, the data connection is maintained between the UE 1 and the network 2. Transition into mode 20 may be determined by the inactivity schedule. In mode 20, it would be possible that a further signal which is communicated in response to communicating the wake-up signal directly encodes a user-data message associated with the data connection. No random access procedure is required.

Thus, in such an example, the data connection between the network 2 and the UE 1 may be established and the wake-up signal may then be communicated while the connection is established. In such a scenario, the BS 23 may have to select between transmitting a DL scheduling grant indicative of resources allocated to a DL user-data message on the DL shared channel and transmitting the wake-up signal, depending on the inactivity schedule of the main receiver 7. The UE 1, in mode 20 is not required to repeatedly listen for DL control information (DCI). Mode 20 offers low latency transmission of payload data, possibly at the expense of more complicated bookkeeping, e.g., by the BS 23.

Differently, in the mode 21, the data connection 22 is not maintained between the UE 1 and the network 2. A random access procedure, triggered by paging, may be required. For example, a paging signal may be communicated after communicating the wake-up signal. The paging signal may unambiguously identify the identity of the user equipment that is addressed to the wake-up signal, e.g., because higher-complexity modulation allows for encoding more data. Thus, based on the paging signal, any ambiguities that may arise from a false alarm wake-up signal may be resolved.

In the example of FIG. 5, scenarios are illustrated in which both low-power modes 20, 21 implement a DRX cycle of the low-power receiver 6. In other examples, it would also be possible that the wake-up signal 4 is not communicated in accordance with the timing of the DRX 20, 21 such that the low-power receiver 6 is persistently fit to receive wake-up signals 4, i.e., does not implement on durations and off durations.

Figure 6:
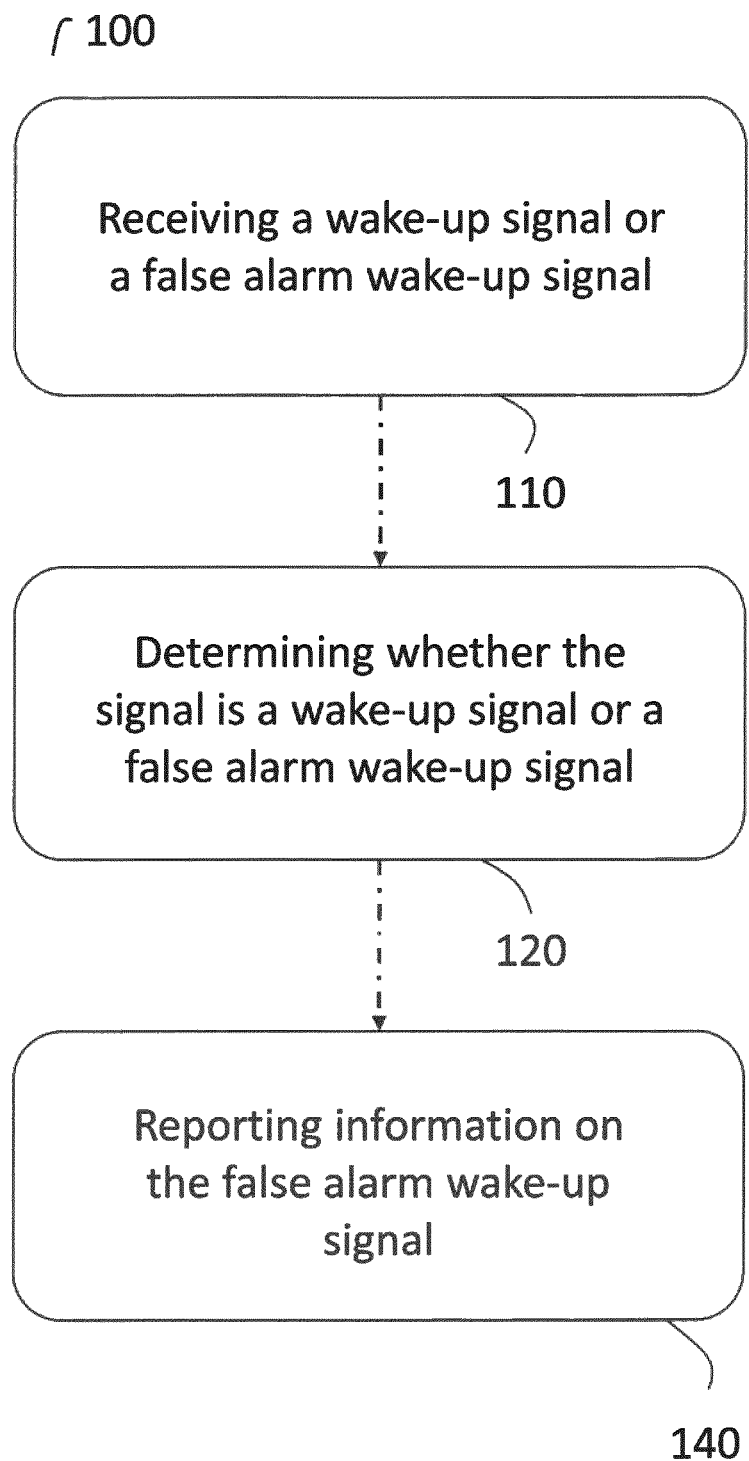
FIG. 6 is a flowchart of a method for monitoring wireless data communication according to various examples.
Figure 7:
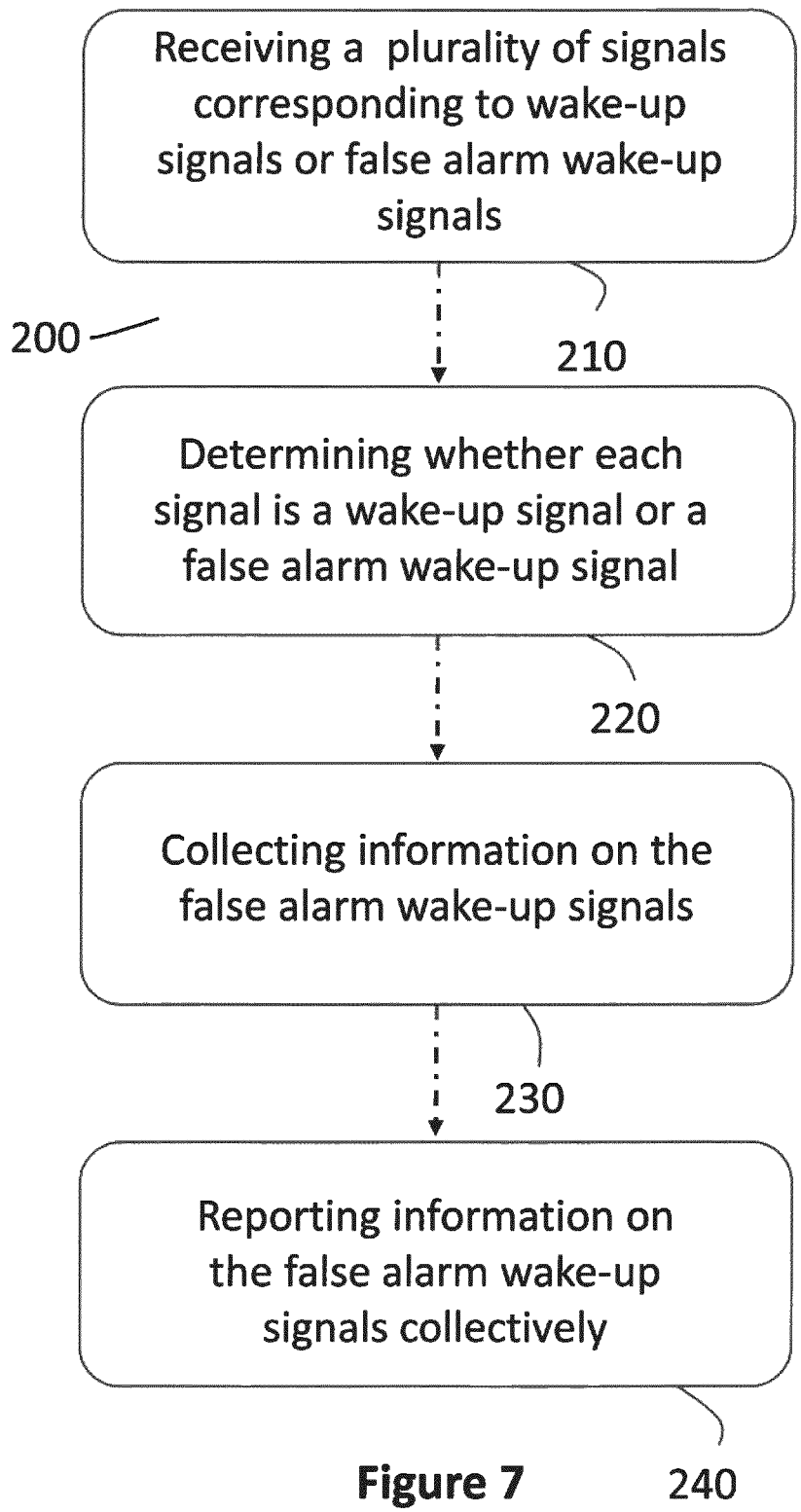
FIG. 7 is a flowchart of a method for monitoring wireless data communication according to various examples.
Figure 8:
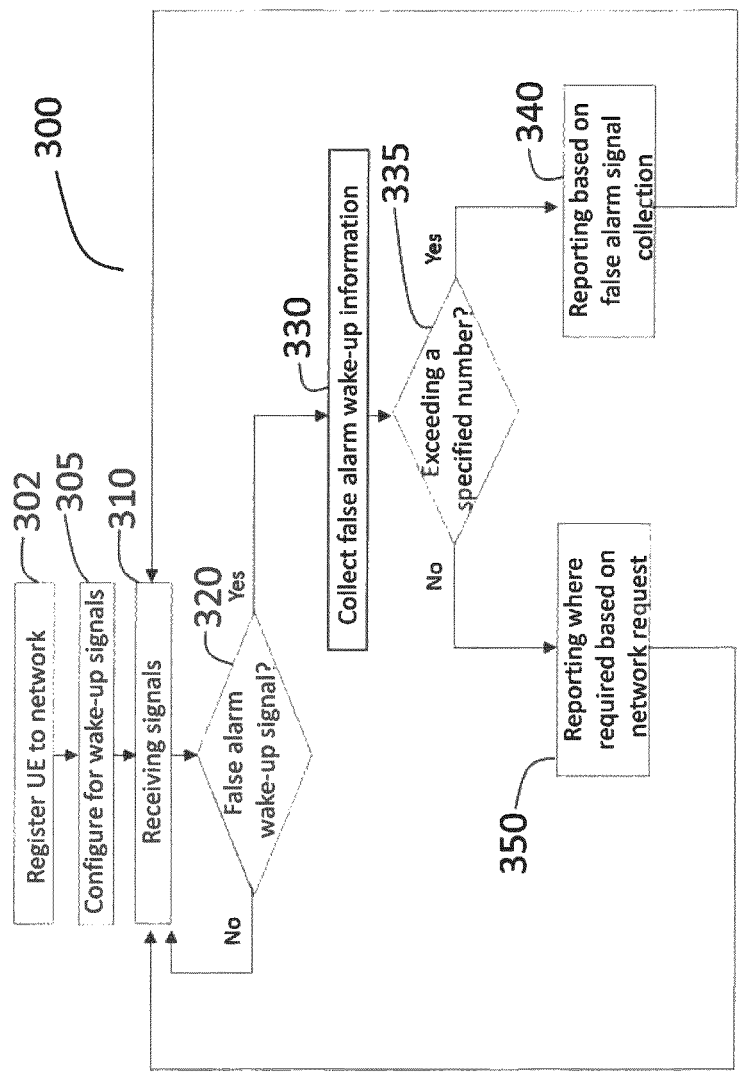
FIG. 8 is a flowchart of a method for monitoring wireless data communication according to various examples.

FIGS. 6 to 8 refer to methods 100, 200, 300 for monitoring wireless data communication by a UE 1 connected to a wireless data network 2 according to various examples. Any of these methods 100, 200, 300 may be performed in an environment according to FIG. 1. The UE 1 performing any of these methods 100, 200, 300 may comprise a configuration according to FIGS. 2, 3a and 3b. The wake-up signals 4 received and identified by the UE 1 may be assembled according to FIG. 4. The false alarm wake-up signals 5 received and identified by the UE 1 may comprise a design comprising a similarity with the design of the wake-up signal 4. One or more characteristics may be stored between the false alarm wake-up and the wake-up signal. The UE 1 may comprise a low-power receiver 6 and a main receiver 7, wherein the coaction of these receivers may induce a switch in between modes 17-21 of the UE 1 according to FIG. 5. For this purpose, wake-up signals 4 may be used.

FIG. 6 is a flowchart of a method 100 for monitoring wireless data communication according to various examples. The method 100 may be performed by the UE 1, which is connected to the wireless data network 2.

At 110, at least one signal 3 may be received by the UE 1. The signal 3 may be a wake-up signal 4, a false alarm wake-up signal 5 or any other signal comprising at least one characteristic of a wake-up signal 4. The at least one characteristic of the wake-up signal may include at least one of a time-resource, a frequency-resource, a symbol sequence and a symbol modulation of the wake-up signal. The signal 3 may be received by a low-power receiver 6, wherein the reception of the signal 3 may induce a transition of the main receiver 7 from an inactive state towards an active state.

At 120, the UE 1 may determine whether the at least one signal 3 is a wake-up signal or a false alarm wake-up signal 5. This may be performed by the control circuitry 14 of the UE 1. Hereby, determining 120 whether the at least one signal 3 is a wake-up signal or a false alarm wake-up signal 5 may be based on at least one of a time resource, a frequency-resource, a bit signal and a preamble of the false alarm wake-up signal 5. For example, if at least one characteristic of the false alarm wake-up signal 5 differs from the set of characteristics expected for the wake-up signal 3, this may be an indication for the false alarm. Further, if in response to the wake-up signal a paging message is received—e.g., by the main receiver—which is not directed to the respective UE, this may be an indication that the wake-up signal is a false alarm wake-up signal.

Similarly, the false alarm wake-up signal may be detected by subsequent signaling from the user equipment to the network not being appropriately responded to by the network. Generally, the determining whether the at least one signal is a wake-up signal or a false alarm wake-up signal is based on at least one further signal subsequently communicated from the user equipment 1 to the network 2 or from the network 2 to the user equipment 1.

Subsequently at 140, the UE 1 may perform reporting, based on 120, information on the at least one signal 3 to the wireless data network. Herein, reporting 140, based on said determining 120, information on the at least one signal 3 to the wireless data network 2 may be performed by the main receiver 7. Hereby, reporting 140, based on said determining 120, information on the at least one signal 3 to the wireless data network 2 may comprise selectively executing the reporting 140, if the at least one signal 3 is a false alarm wake-up signal 5. In this context, reporting 140 may be for monitoring wireless data communication and may achieve an improvement in terms of reliability of wireless data communication.

FIG. 7 is a flowchart of a further method 200 for monitoring wireless data communication according to various examples. The method 200 may be performed by the UE 1, which is connected to the wireless data network 2. The method 200 may be based on method 100, but may also comprise additional technical means.

At 210, a plurality of signals 3 corresponding to a wake-up signal 4 or a false alarm wake-up signal 5 may be received by the UE 1. For doing so, a low-power receiver 6 may be provided.

At 220, determining whether the received signal 3 is a wake-up signal 4 or a false alarm wake-up signal 5 may be performed for any of the plurality of received signals.

At 230, the method 200 additionally provides for collecting information on the false alarm wake-up signals 5 of the plurality of received signals 3. Hereby, collecting 230 information on the false alarm wake-up signals may include information regarding a) point of time of receiving each of the false alarm wake-up signals 5 and/or b) the geographical location of the UE 1 at the point of time of receiving each of the false alarm wake-up signals 5.

Subsequently at 240, the UE 1 may report information on the collected 230 false alarm wake-up signals 5 of the plurality of received signals 3 to the wireless data network in a collective manner, i.e. a plurality of information on false alarm wake-up signals may be reported to the wireless network 2 in a common UE control signal or message.

FIG. 8 is a flowchart of a further method 300 for monitoring wireless data communication according to various examples. The method 300 may be performed by the UE 1 that is registered with the wireless data network. The method 300 may be based on method 100 and method 200, respectively, but may also comprise additional technical means.

At 302, the UE 1 may register to the wireless data network 2.

At 305, the UE 1 may be configured to listen for wake-up signals 4. For example the UE 1 may be in one of modes 20 and 21.

Subsequently at 310, the UE 1 may receive a plurality of signals 3 comprising at least one characteristic of a wake-up signal 4. As an example, these signals 3 may refer to wake-up signals 4 and/or false alarm wake-up signals 5.

Subsequently at 320, the UE 1 determines whether the received signals 3 are wake-up signals 4 or false alarm wake-up signals 5. In case that a determined signal is not a false alarm wake-up signal 5, the method may return to 310, wherein the UE 1 awaits for receiving future signals 3. In case that a determined signal is a false alarm wake-up signal 5, the method 300 may be proceeded at 330.

At 330, the UE 1 may collect information on the false alarm wake-up signals 5 of the plurality of received signals 3. Going along with this, it may be decided at 335, whether the collecting 330 information on the false alarm wake-up signals 5 exceeds a specified number. For doing so, triggering means may be implemented. The specified number may refer to at least one of a) an absolute number of false alarm wake-up signals 5 or b) a percentage number of false alarm wake-up signals 5 with respect to the total number of received signals 3.

In case that this specified number is exceeded at 335, the UE 1 reports 340 the false alarm wake-ups signals 5 to the wireless data network 2 in a collective manner. Subsequently, the method 300 may return to await for receiving 310 signals.

In case that this specified number is exceeded at 335, the UE 1 does not yet report 340 the false alarm wake-ups signals 5 to the wireless data network 2 in a collective manner. The method 300 may then be proceeded at 350.

At 350, collectively reporting information on the false alarm wake-up signal 5 of the plurality of received signals 3 to the wireless data network 2 may be performed when it is requested by the wireless data network.

Figure 9:
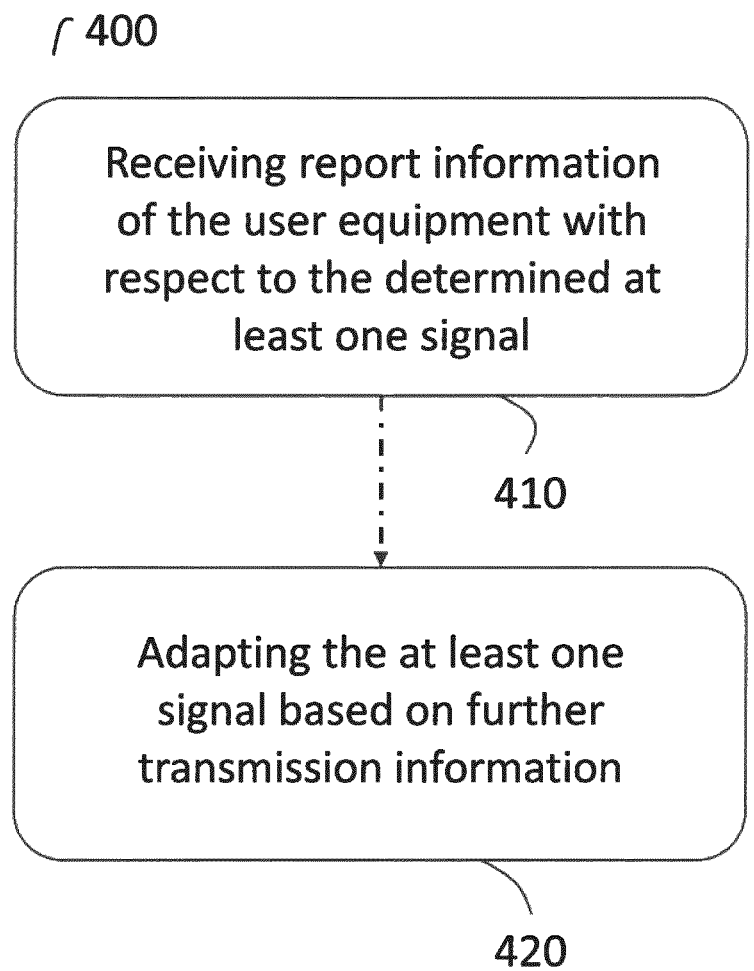
FIG. 9 is a flowchart of a method for monitoring wireless data communication according to various examples.

FIG. 9 is a flowchart of a method 400 for monitoring wireless data communication according to various examples. The method 400 may be performed by the wireless data network 2 connected to the UE 1. The method 400 may be performed in response to any of the methods 100 to 300 depicted in FIGS. 6 to 8.

At 410, information reported by the UE 1 may be received by the wireless data network 2. Hereby, the information may refer to at least one signal 3, which is determined by the UE 1 as a wake-up signal 4 or as a false alarm wake-up signal 5.

At 420, the at least one signal 3 may be adapted based on the information for further transmission of the at least one signal 3.

The invention claimed is:

1. A method for monitoring wireless data communication by a user equipment connected to a wireless data network, comprising the following steps performed by the user equipment:
   receiving at least one signal, wherein the at least one signal comprises at least one characteristic of a wake-up signal;
   determining whether the at least one signal is a wake-up signal or a false alarm wake-up signal; and
   reporting, based on said determining, information on the at least one signal to the wireless data network, wherein reporting information on the at least one signal to the wireless data network includes selectively executing the reporting when the at least one signal is a false alarm wake-up signal, and wherein the method further comprises:

collecting information on the false alarm wake-up signals of the plurality of received signals; and collectively reporting information on the false alarm wake-up signals of the plurality of received signals to the wireless data network, and wherein collecting information on the false alarm wake-up signals includes information regarding the geographical location of the user equipment at the point of time of receiving each of the false alarm wake-up signals.

2. The method of claim 1, wherein the collectively reporting information on the false alarm wake-up signals of the plurality of received signals to the wireless data network is performed when the collected false alarm wake-up signals exceeds a specified number.

3. The method of claim 2, wherein the specified number refers to at least one of a) an absolute number of false alarm wake-up signals or b) a percentage number of false alarm wake-ups signals with respect to the total number of received signals.

4. The method of claim 1, wherein collectively reporting information on the false alarm wake-up signals of the plurality of received signals to the wireless data network is performed when it is requested by the wireless data network.

5. The method of claim 1, wherein collecting information on the false alarm wake-up signals includes information regarding point of time of receiving each of the false alarm wake-up signals.

6. The method of claim 1, wherein receiving the at least one signal is performed by a low-power receiver, and wherein said reception induces a transition of a main receiver from an inactive state towards an active state.

7. The method of claim 1, wherein the at least one characteristic of the wake-up signal includes at least one of a time-resource, a frequency-resource, a symbol sequence and a symbol modulation of the wake-up signal.

8. The method of claim 1, wherein the determining whether the at least one signal is a wake-up signal or a false alarm wake-up signal is based on at least one of a time-resource, a frequency-resource a bit signal and a preamble of the false alarm wake-up signal.

9. The method of claim 1, wherein the determining whether the at least one signal is a wake-up signal or a false alarm wake-up signal is based on at least one further signal subsequently communicated between the user equipment and the wireless data network.

10. The method of claim 1, wherein receiving the at least one signal is performed by a low-power receiver, and wherein reporting, based on said determining, information on the at least one signal to the wireless data network is performed by a main receiver.

11. A user equipment adapted for establishing a wireless data communication with a wireless data network and comprising a low-power receiver and a main receiver, control circuitry, memory, and program code stored in memory, wherein the program code is executed by the control circuitry to configure the user equipment to monitor the wireless data communication by:

receiving at least one signal, wherein the at least one signal comprises at least one characteristic of a wake-up signal;

determining whether the at least one signal is a wake-up signal or a false alarm wake-up signal; and reporting, based on said determining, information on the at least one signal to the wireless data network, wherein the reporting information on the at least one signal includes selectively executing the reporting when the at least one signal is a false alarm wake-up signal, and wherein the user equipment is further adapted to monitor the wireless data communication by:

collecting information on the false alarm wake-up signals of the plurality of received signals; and collectively reporting information on the false alarm wake-up signals of the plurality of received signals to the wireless data network, and wherein collecting information on the false alarm wake-up signals includes information regarding the geographical location of the user equipment at the point of time of receiving each of the false alarm wake-up signals.

12. A node of a wireless data network adapted for establishing a wireless data communication with a user equipment and having a receiver, control circuitry, memory, and program code stored in memory, wherein the program code is executed by the control circuitry to configure the network node to monitor the wireless data communication by:

receiving information reported by the user equipment, wherein the reported information refers to at least one signal which is determined by the user equipment as a false alarm wake-up signal, wherein the information on the false alarm wake-up signals includes information regarding the geographical location of the user equipment at the point of time of receiving each of the false alarm wake-up signals; and adapting the at least one signal based on the information for further transmission of the at least one signal.

* * * * *